(12) United States Patent
Ryu et al.

(10) Patent No.: US 9,563,080 B2
(45) Date of Patent: Feb. 7, 2017

(54) DISPLAY DEVICE

(71) Applicant: Samsung Display Co., Ltd., Yongin, Gyeonggi-Do (KR)

(72) Inventors: Jang Wi Ryu, Seoul (KR); Gak Seok Lee, Hwaseong-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/688,385

(22) Filed: Apr. 16, 2015

(65) Prior Publication Data

US 2016/0109758 A1    Apr. 21, 2016

(30) Foreign Application Priority Data

Oct. 15, 2014  (KR) .................. 10-2014-0139244

(51) Int. Cl.
```
G02F 1/1337    (2006.01)
C09K 19/54     (2006.01)
C09K 19/56     (2006.01)
G02F 1/1368    (2006.01)
G02F 1/1362    (2006.01)
C09K 19/52     (2006.01)
```

(52) U.S. Cl.
CPC ......... *G02F 1/133711* (2013.01); *C09K 19/56* (2013.01); *G02F 1/1368* (2013.01); *G02F 1/136286* (2013.01); *C09K 2019/521* (2013.01); *C09K 2019/523* (2013.01); *G02F 2001/133738* (2013.01)

(58) Field of Classification Search
CPC ..... C09K 19/523; C09K 19/544; C09K 19/56; G02F 1/133711; G02F 1/133738; G02F 1/136286

See application file for complete search history.

(56) References Cited

U.S. PATENT DOCUMENTS

| | | | |
|---|---|---|---|
| 2012/0168058 A1* | 7/2012 | Kim ................ | B29D 11/0073 156/101 |
| 2013/0208225 A1* | 8/2013 | Kwon ............. | G02F 1/134309 349/144 |
| 2013/0215346 A1* | 8/2013 | Lee ................. | C09K 19/52 349/42 |
| 2014/0354938 A1* | 12/2014 | Kim ............... | C03C 15/00 349/160 |

FOREIGN PATENT DOCUMENTS

| | | |
|---|---|---|
| KR | 1020010027351 A | 4/2001 |
| KR | 1020060088973 A | 8/2006 |
| KR | 1020130096456 A | 8/2013 |
| WO | 2011034300 A2 | 3/2011 |
| WO | 2013077570 A1 | 5/2013 |

* cited by examiner

*Primary Examiner* — Shean C Wu
(74) *Attorney, Agent, or Firm* — Robert E. Bushnell, Esq.

(57) ABSTRACT

A display device according to the exemplary embodiment of the present invention includes: a first insulation substrate; a pixel electrode disposed on the first insulation substrate; a first alignment layer disposed on the pixel electrode; a second insulation substrate facing the first insulation substrate; a common electrode disposed on the second insulation substrate; and a liquid crystal layer disposed between the first and second insulation substrates. The liquid crystal layer includes liquid crystal molecules and nanoparticles, and the nanoparticles are disposed adjacent to the common electrode.

14 Claims, 20 Drawing Sheets

0 V

8 V

0 V

8 V

DISPLAY DEVICE

CLAIM OF PRIORITY

This application claims the priority to and all the benefits accruing under 35 U.S.C. §119 of Korean Patent Application No. 10-2014-0139244 filed in the Korean Intellectual Property Office ("KIPO") on Oct. 15, 2014, the entire contents of which are incorporated herein by reference.

BACKGROUND OF THE INVENTION

Field of the Invention

The present invention relate to a display device.

Description of the Related Art

As one of the most widely used flat panel displays at present, a liquid crystal display (LCD) includes two display panels on which field generating electrodes such as a pixel electrode and a common electrode are formed, and a liquid crystal layer interposed between the two display panels.

The LCD displays an image by generating an electric field on a liquid crystal layer by applying a voltage to the field generating electrodes, determining alignment directions of liquid crystal molecules of the liquid crystal layer using the generated field, and controlling polarization of incident light.

Among the LCDs, a vertically aligned mode LCD, in which liquid crystal molecules are aligned so that their long axes are perpendicular to the upper and lower panels while no electric field is applied, has been in the limelight because its contrast ratio is high and a wide reference viewing angle is easily implemented.

In such a vertical alignment mode LCD, a plurality of domains in which alignment directions of liquid crystals are different may be formed in one pixel to implement a wide viewing angle.

As a means of forming the plurality of domains as such, there is a method of forming cutouts such as slits and the like in the field generating electrodes.

Using the method, the liquid crystals are rearranged by a fringe field generated between edges of the cutouts and the field generating electrodes facing the edges thereof, thereby forming the plurality of domains.

Recently, an initial alignment method in which the liquid crystals have pretilts in the absence of an electric field has been proposed to improve a response speed of the liquid crystals as well as to implement a wide viewing angle.

An alignment layer having various alignment directions may be used to allow the liquid crystals to have the pretilts in various directions, or an alignment aid for allowing the liquid crystals to be pretilted in the liquid crystal layer is added and an electric field is then applied to the liquid crystal layer such that the alignment aid is hardened.

The alignment aid hardened due to heat or light such as ultraviolet rays and the like may allow the liquid crystals to be pretilted in a predetermined direction.

In this case, the voltage is applied to each of the electric field generating electrodes to generate the electric field in the liquid crystal layer.

However, when the LCD including the pretilts is applied to a curved display device, texture due to misalignment occurs, thereby causing transmittance to be decreased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display device, particularly, a curved display device, in which display abnormalities such as texture or smudges due to misalignment are improved.

A display device according to the exemplary embodiment of the present invention includes: a first insulation substrate; a pixel electrode disposed on the first insulation substrate; a first alignment layer disposed on the pixel electrode; a second insulation substrate facing the first insulation substrate; a common electrode disposed on the second insulation substrate; and a liquid crystal layer disposed between the first and second insulation substrates. The liquid crystal layer includes liquid crystal molecules and nanoparticles, and the nanoparticles are disposed adjacent to the common electrode.

The nanoparticles may include a chain-shaped hydrocarbon, and the chain-shaped hydrocarbon may include two terminal ends that respectively include a hydrophilic group and a hydrophobic group.

The common electrode and the hydrophilic group of the nanoparticles may be adjacent to each other.

The chain-shaped hydrocarbon may extend in a direction perpendicular to a flat surface of the common electrode.

The liquid crystal molecules may be adjacent to the terminal end in which the hydrophobic group is disposed, and the liquid crystal molecules may be vertically aligned when no electric field is applied to the common electrode.

The nanoparticles may include any one of hexadecyl trimethyl ammonium bromide (HTAB) and polyhedral oligomeric silsesquioxanes (POSS).

The nanoparticles may be represented by the following Chemical Formula 1 or Chemical Formula 2, Chemical Formula 1

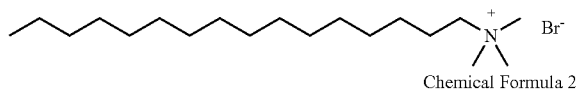

Chemical Formula 2

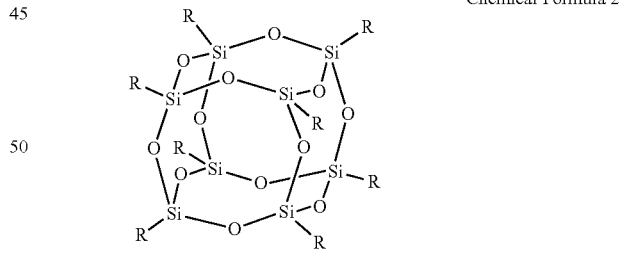

wherein the R is an isobutyl group.

The content of the nanoparticle may be about less than 0.05 wt %.

The first alignment layer may include an alignment polymer.

Liquid crystal molecules adjacent to the first alignment layer may have pretilts, and liquid crystal molecules adjacent to the nanoparticles may be vertically aligned.

The display device may further include a thin film transistor that is disposed on the first insulation substrate to be coupled to the pixel electrode, and the pixel electrode may include a plurality of minute branch portions.

The thin film transistor may include a gate line and a data line that are insulated from and cross each other, and the pixel electrode may include a first subpixel electrode and a second subpixel electrode.

The first and second subpixel electrodes may be spaced apart from each other based on the gate line.

A voltage difference between the first subpixel electrode and the common electrode may be greater than that between the second subpixel electrode and the common electrode.

The display device may be a curved type. The display device described above may reduce the display defects such as the texture or smudges due to the misalignment, and control reduction in transmittance even if the misalignment occurs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
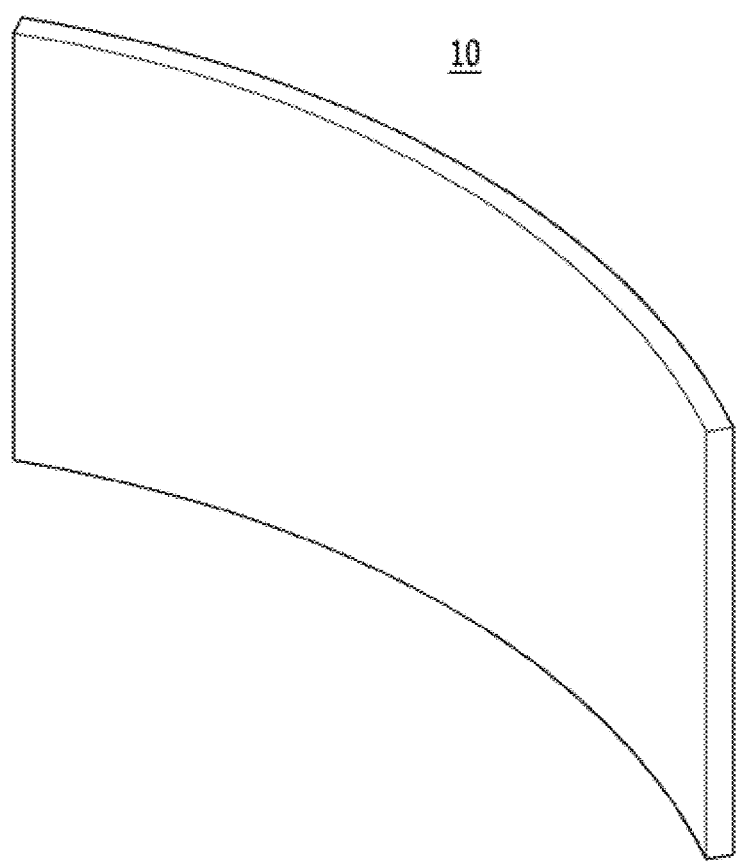
FIG. 1 is a schematic perspective view of a curved display device according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

On the contrary, exemplary embodiments introduced herein are provided to make disclosed contents thorough and complete and to sufficiently transfer the spirit of the present invention to those skilled in the art.

In the drawings, the thickness of layers and regions may be exaggerated for clarity.

In addition, when a layer is described to be formed on another layer or on a substrate, this means that the layer may be formed on the other layer or on the substrate, or a third layer may be interposed between the layer and the other layer or the substrate.

Like reference numerals designate like elements throughout the specification.

A curved display device according to an exemplary embodiment of the present invention will now be described with reference to FIGS. 1 to 5.

Figure 2:
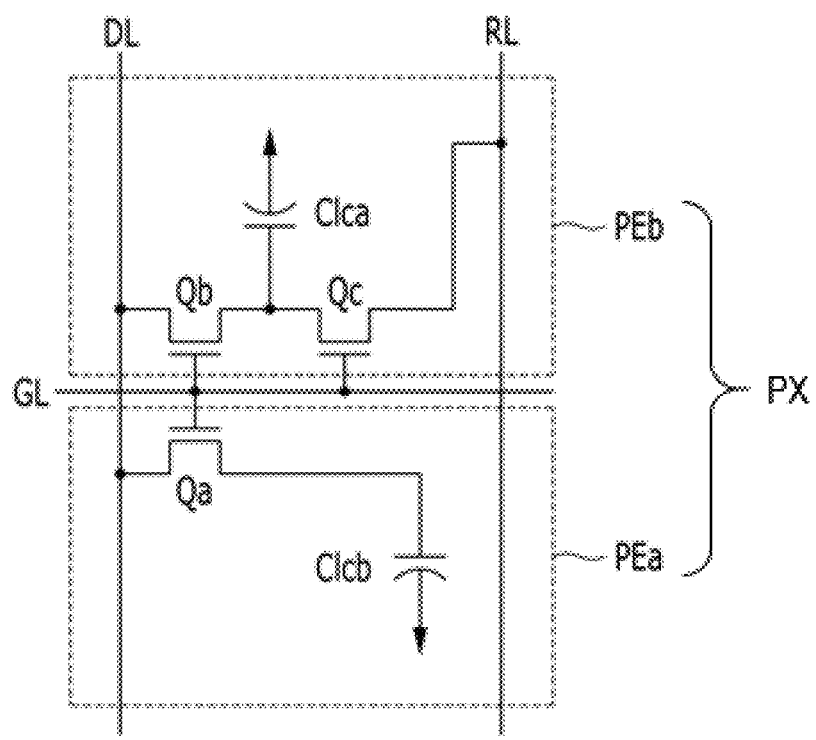
FIG. 2 is a circuit diagram of one pixel according to the exemplary embodiment of the present invention.
Figure 3:
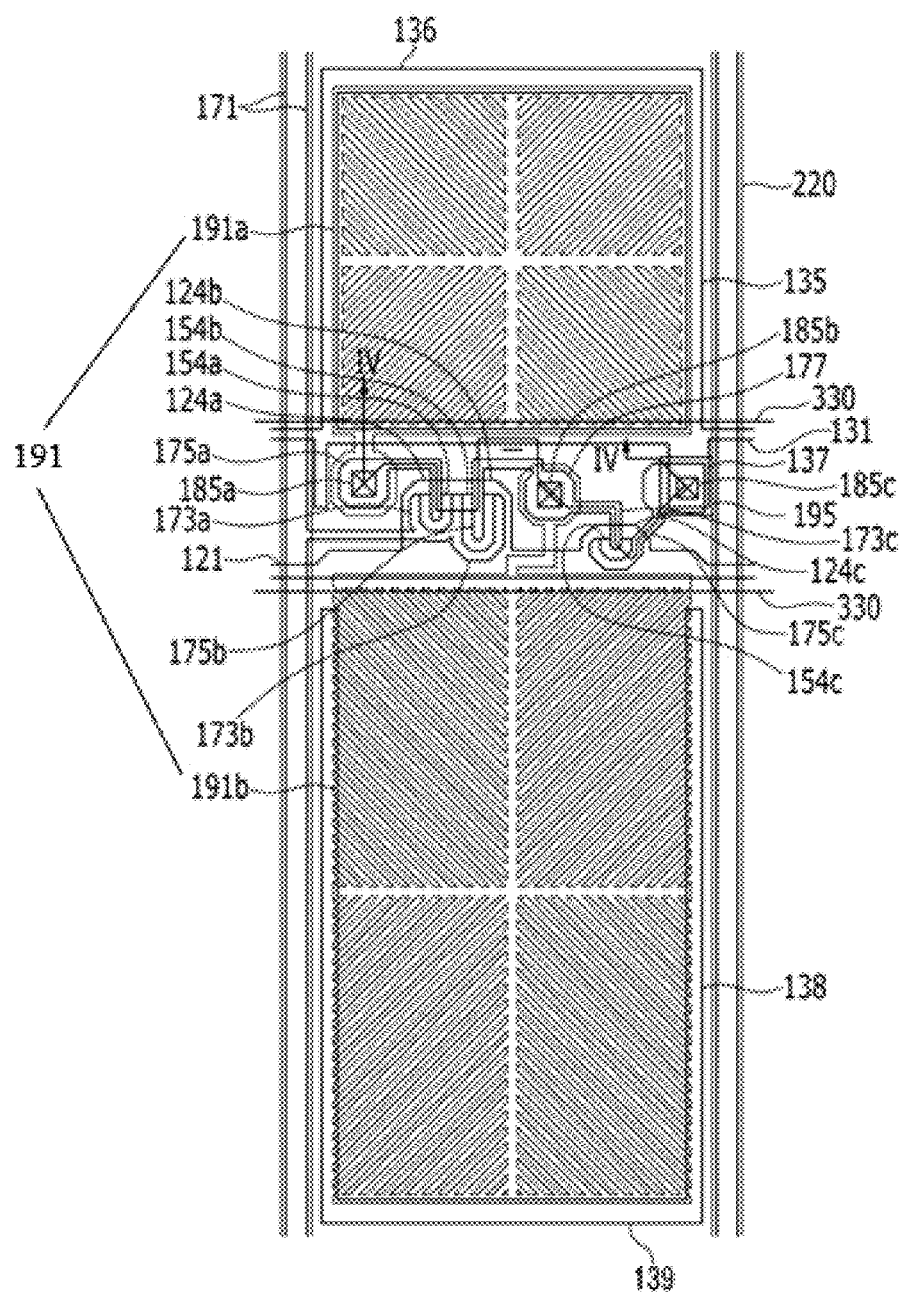
FIG. 3 is a top plan view of one pixel according to the exemplary embodiment of the present invention.
Figure 4:
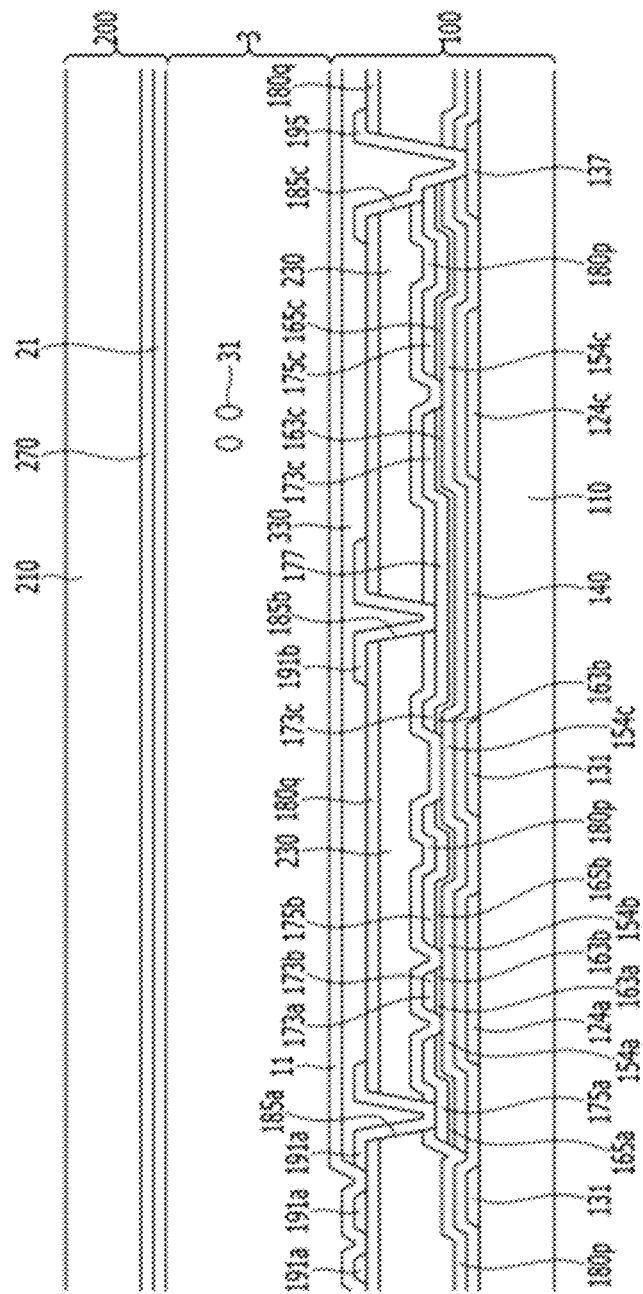
FIG. 4 is a cross-sectional view of FIG. 3 taken along the line IV-IV.
Figure 5:
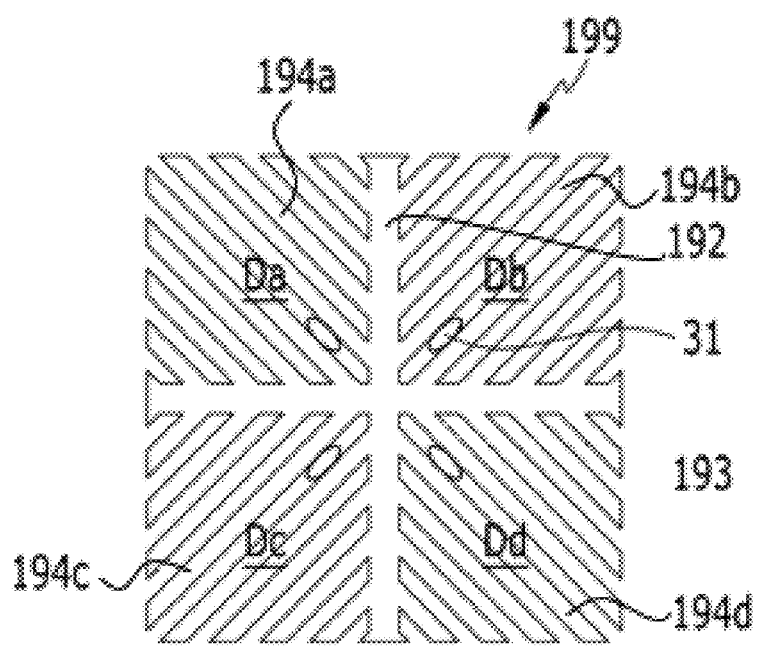
FIG. 5 is a top plan view of a basic electrode according to the exemplary embodiment of the present invention.

FIG. 1 is a schematic perspective view of a curved display device according to the exemplary embodiment of the present invention, FIG. 2 is a circuit diagram of one pixel according to the exemplary embodiment of the present invention, FIG. 3 is a top plan view of one pixel according to the exemplary embodiment of the present invention, FIG. 4 is a cross-sectional view of FIG. 3 taken along the line IV-IV, and FIG. 5 is a top plan view of a basic electrode according to the exemplary embodiment of the present invention.

Referring first to FIG. 1, the display device 10 according to the exemplary embodiment of the present invention may be a curved type.

As an example, the display device may be horizontally curved along its long axis or vertically curved along its short axis.

In the present specification, the curved display device 10 will be described, but the present invention is not limited thereto and may be applicable to a flat panel display.

In the curved display device described above, arrangement of signal lines and pixels of the display device and a driving method thereof will be described with reference to FIG. 2.

FIG. 2 is the equivalent circuit diagram of one pixel of the curved display device according to the exemplary embodiment of the present invention.

Referring to FIG. 2, one pixel PX of the liquid crystal display (LCD) according to the present exemplary embodiment includes: a plurality of signal lines including a gate line GL for transmitting a gate signal, a data line DL for transmitting a data signal, and a divided reference voltage line RL for transmitting a divided reference voltage; first, second, and third switching elements Qa, Qb, and Qc that are coupled the plurality of signal lines; and first and second liquid crystal capacitors Clca and Clcb.

The first and second switching elements Qa and Qb are respectively coupled to the gate line GL and the data line DL, and the third switching element Qc is coupled to an output terminal of the second switching element Qb and the divided reference voltage line RL.

The first and second switching elements Qa and Qb are three-terminal elements such as a thin film transistor and the like, control terminals thereof are coupled to the gate line GL, input terminals thereof are coupled to the data line DL, an output terminal of the first switching element Qa is coupled to the first liquid crystal capacitor Clca, and an output terminal of the second switching element Qb is coupled to the second liquid crystal capacitor Clcb and an input terminal of the third switching element Qc.

The third switching element Qc is also a three-terminal element such as the thin film transistor and the like, a control terminal thereof is coupled to the gate line GL, the input terminal thereof is coupled to the second liquid crystal capacitor Clcb, and an output terminal thereof is coupled to the divided reference voltage line RL.

When a gate-on signal is applied to the gate line GL, the first, second, and third switching elements Qa, Qb, and Qc coupled thereto are turned on.

Accordingly, a data voltage applied to the data line DL is applied to a first subpixel electrode PEa and a second subpixel electrode PEb by the turned-on first and second switching elements Qa and Qb.

In this case, the data voltages applied to the first and second subpixel electrodes PEa and PEb are identical to each other, and the first and second liquid crystal capacitors Clca and Clcb are charged with the same amount of charges corresponding to a difference between a common voltage and the data voltage.

Simultaneously, a voltage charged to the second liquid crystal capacitor Clcb is divided by the turned-on third switching element Qc.

Thus, the voltage charged to the second liquid crystal capacitor Clcb decreases by a difference between the common voltage and the divided reference voltage.

That is, a voltage charged to the first liquid crystal capacitor Clca is higher than a voltage charged to the second liquid crystal capacitor Clcb.

As such, the voltages charged to the first and second liquid crystal capacitors Clca and Clcb become different from each other.

Since the voltages of the first and second liquid crystal capacitors Clca and Clcb become different from each other, the first and second subpixels includes liquid crystal molecules 31 having different tilt angles such that they respectively have different luminances.

Accordingly, when the voltages of the first and second liquid crystal capacitors Clca and Clcb are appropriately adjusted, an image viewed from the front is as close as possible to an image viewed from a side, thereby improving side visibility.

The third switching element Qc coupled to the second liquid crystal capacitor Clcb and the divided reference voltage line RL is included in the illustrated exemplary embodiment to make the voltages charged to the first and second liquid crystal capacitors Clca and Clcb different, but in an LCD according to another exemplary embodiment of the present invention, the second liquid crystal capacitor Clcb may be coupled to a step-down capacitor.

Specifically, an amount of charges charged in the second liquid crystal capacitor Clcb, which includes an amount of charges charged in the third switching element including a first terminal coupled to a step-down gate line, a second terminal coupled to the second liquid crystal capacitor Clcb, and a third terminal coupled to the step-down capacitor, is partially charged in the step-down capacitor, thereby differently setting the charged voltages between the first and second liquid crystal capacitors Clca and Clcb.

Alternatively, in the LCD according to another exemplary embodiment of the present invention, the first and second liquid crystal capacitors Clca and Clcb may be respectively coupled to different data lines such that they are applied with different data voltages, thereby differently setting the charged voltages between the first and second liquid crystal capacitors Clca and Clcb.

As a further alternative, the charged voltages between the first and second liquid crystal capacitors Clca and Clcb can be differently set using various different methods.

A structure of the display device according to the exemplary embodiment illustrated in FIG. 2 will now be schematically described with reference to FIGS. 3 to 5.

FIG. 3 is a top plan view of one pixel according to the exemplary embodiment of the present invention, and FIG. 4 is a cross-sectional view of FIG. 3 taken along the line IV-IV.

FIG. 5 is a top plan view of a basic electrode of the display device according to the exemplary embodiment of the present invention.

Referring first to FIGS. 3 and 4, the curved display device according to the present exemplary embodiment includes: lower and upper panels 100 and 200 facing each other; a liquid crystal layer 3 interposed between the two display panels 100 and 200; and a pair of polarizers (not shown) attached to outer surfaces of the display panels 100 and 200.

The lower panel 100 will be described first.

A gate conductor including a gate line 121 and a divided reference voltage line 131 is formed on a first insulation substrate 110 that is formed of transparent glass, plastic, or the like.

The gate line 121 includes a first gate electrode 124a, a second gate electrode 124b, a third gate electrode 124c, and a wide end portion (not shown) for connection with another layer or an external driving circuit.

The divided reference voltage line 131 includes first storage electrodes 135 and 136 and a reference electrode 137.

Though not coupled to the divided reference voltage line 131, second storage electrodes 138 and 139 are disposed to overlap a second subpixel electrode 191b.

A gate insulating layer 140 is formed on the gate line 121 and the divided reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A plurality of data lines 171 including a first source electrode 173a and a second source electrode 173b, and data conductors including a first drain electrode 175a, a second drain electrode 175b, a third source electrode 173c, and a third drain electrode 175c, are formed on the ohmic contacts 163a, 165a, 163b, 165b, 163c, and 165c and the gate insulating layer 140.

The data conductors, the semiconductor disposed thereunder, and the ohmic contacts may be simultaneously formed using one mask.

The data line 171 includes a wide end portion (not shown) for connection with another layer or an external driving circuit.

Along with the island-like first semiconductor 154a, the first gate electrode 124a, the first source electrode 173a, and the first drain electrode 175a form a first thin film transistor (TFT) Qa, and a channel of the first TFT is formed in the semiconductor 154a between the first source electrode 173a and the first drain electrode 175a.

Similarly, along with the island-like second semiconductor 154b, the second gate electrode 124b, the second source electrode 173b, and the second drain electrode 175b form a second TFT Qb, and a channel thereof is formed in the semiconductor 154b between the second source electrode 173b and the second drain electrode 175b, while the third gate electrode 124c, the third source electrode 173c, and the third drain electrode 175c along with the island-like third semiconductor island 154c form a third TFT Qc, and a channel thereof is formed in the semiconductor 154c between the third source electrode 173c and the third drain electrode 175c.

The second drain electrode 175b is coupled to the third source electrode 173c and includes a wide expansion 177.

A first passivation layer 180p is formed on the data conductors 171, 173c, 175a, 175b, and 175c and exposed portions of the semiconductors 154a, 154b, and 154c.

The first passivation layer 180p may include an inorganic insulating layer that is formed of a silicon nitride, a silicon oxide, or the like.

The first passivation layer 180p may prevent a pigment of a color filter 230 from being introduced into the exposed portions of the semiconductors 154a, 154b, and 154c.

The color filter 230 is formed on the first passivation layer 180p.

The color filter 230 vertically extends along two data lines that are adjacent to each other.

A first light blocking member 220 is disposed on the first passivation layer 180p, an edge of the color filter 230, and the data line 171.

The first light blocking member 220 extends along the data line 171, and is disposed between the two adjacent color filters 230.

A width of the first light blocking member 220 may be greater than that of the data line 171.

As such, since the width of the first light blocking member 220 is formed greater than that of the data line 171, the first light blocking member 220 may prevent incident light from the outside from being reflected from a metallic surface of the data line 171.

Accordingly, the light reflected from the surface of the data line 171 interferes with light passing through the liquid crystal layer 3, thereby preventing a contrast ratio of the crystal display from being deteriorated.

A second passivation layer 180q is formed on the color filter 230 and the first light blocking member 220.

The second passivation layer 180q may include an inorganic insulating layer that is formed of a silicon nitride, a silicon oxide, or the like.

The second passivation layer 180q not only prevents the color filter 230 from being lifted but also suppresses contamination of the liquid crystal layer by an organic material such as a solvent introduced from the color filter 230, thereby preventing defects such as a residual image that can occur when a screen is driven.

A first contact hole 185a and a second contact hole 185b are formed in the first and second passivation layers 180p and 180q to expose the first and second drain electrodes 175a and 175b, respectively.

A third contact hole 185c is formed in the first passivation layer 180p, the second passivation layer 180q, and the gate insulating layer 140 to partially expose the reference electrode 137 and the third drain electrode 175c, and the third contact hole 185c is covered with a connecting member 195.

The connecting member 195 electrically couples the reference electrode 137 and the third drain electrode 175c that are exposed through the third contact hole 185c.

A plurality of pixel electrodes 191 are formed on the second passivation layer 180q.

The pixel electrodes 191 are separated from each other while interposing the gate line 121 therebetween, and respectively include a first subpixel electrode 191a and the second subpixel electrode 191b that neighbor each other in a column direction based on the gate line 121.

The pixel electrode 191 may be formed of a transparent material such as ITO or IZO.

The pixel electrode 191 may be formed of a transparent conductive material such as ITO or IZO, or a reflective metal such as aluminum, silver, chromium, or an alloy thereof.

The first and second subpixel electrodes 191a and 191b respectively include one or more basic electrodes 199 illustrated in FIG. 5 or variations thereof.

The first and second subpixel electrodes 191a and 191b are physically and electrically coupled to the first and second drain electrodes 175a and 175b through the first and second contact holes 185a and 185b, and are applied with the data voltage from the first and second drain electrodes 175a and 175b, respectively.

In this case, the data voltage applied to the second drain electrode 175b may be partially divided by the third source electrode 173c such that the voltage applied to the first subpixel electrode 191a is greater than that applied to the second subpixel electrode 191b.

Along with a common electrode 270 of the upper panel 200, the first and second subpixel electrodes 191a and 191b to which the data voltage is applied generate an electric field, thereby determining directions of liquid crystal molecules 31 of the liquid crystal layer 3 between the two electrodes 191 and 270.

Depending on the directions of the liquid crystal molecules 31 determined as such, luminance of light passing through liquid crystal layer 3 is changed A second light blocking member 330 is disposed on the pixel electrode 191.

The second light blocking member 330 is formed to cover an entire area where the first transistor Qa, the second transistor Qb, and the third transistor Qc and the first to third contact holes 185a, 185b, and 185c are disposed, and extends in the same direction as the gate line 121, thereby partially overlapping the data line 171.

The second light blocking member 330 is disposed to at least partially overlap the two data lines 171 that are disposed at opposite lateral sides of one pixel area, and prevents leakage of light that can occur near the data line 171 and the gate line 121 and near an area where the first transistor Qa, the second transistor Qb, and the third transistor Qc are disposed.

Until the second light blocking member 330 is formed, the first passivation layer 180p, the color filter 230, and the second passivation layer 180q are disposed in the area where the first transistor Qa, the second transistor Qb, and the third transistor Qc are disposed, such that positions of the first transistor Qa, the second transistor Qb, the third transistor Qc, and the first to third contact holes 185a, 185b, and 185c can be easily discriminated.

A first alignment layer 11 is disposed on the second light blocking member 330.

The first alignment layer 11 may be a vertical alignment layer.

The first alignment layer 11 may be formed to include at least one of materials that are generally used as an alignment layer for the liquid crystals, such as polyamic acid, polyimide, or the like.

The first alignment layer 11 may include an alignment polymer, and as an example, may include a reactive mesogen that is formed by UV irradiation.

The reactive mesogen included in the first alignment layer 11 allows the liquid crystal molecules 31 adjacent to the first alignment layer 11 to have pretilts.

The liquid crystal layer 3 has negative dielectric anisotropy, and the liquid crystal molecules 31 of the liquid crystal layer 3 are aligned such that their long axes are perpendicular to surfaces of the two display panels 100 and 200 when no electric field is present.

In the present exemplary embodiment, the liquid crystal layer 3 includes a plurality of liquid crystal molecules 31, as well as nanoparticles (not shown) including a chain-shaped hydrophobic group and a hydrophilic group.

The nanoparticles will be described later in detail.

The upper panel 200 will now be described.

The common electrode 270 is formed on a second insulation substrate 210.

The nanoparticles are arranged on the common electrode 270.

The nanoparticles are arranged to be disposed on the common electrode 270 depending on their properties, and may be disposed to face the first alignment layer 11.

As shown in FIG. 4, the nanoparticles may be arranged such that they form a layer 21, particularly such that they are discriminated from the liquid crystal molecules 31 that are included in the liquid crystal layer 3.

However, this arrangement does not correspond to the alignment layer 11.

The nanoparticles according to the present exemplary embodiment are arranged in an area adjacent to the upper panel 200, particularly adjacent to the common electrode 270.

The nanoparticles arranged on the common electrode 270 allow the liquid crystal molecules 31 to be vertically aligned even when an additional alignment layer is provided.

The nanoparticles may include any one of hexadecyl trimethyl ammonium bromide (HTAB) and polyhedral oligomeric silsesquioxanes (POSS) that are represented by the following Chemical Formula 1 or Chemical Formula 2.

(Chemical Formula 1)

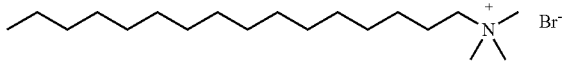

(Chemical Formula 2)

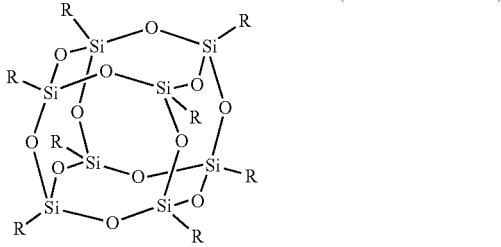

In Chemical Formula 2, R is an isobutyl group.

The nanoparticles represented by Chemical Formula 1 include a chain-shaped hydrocarbon, and the chain-shaped hydrocarbon may extend in a direction perpendicular to a flat surface of the common electrode 270.

The chain-shaped hydrocarbon may have two terminal ends that respectively include a hydrophilic group and a hydrophobic group.

The hydrophilic group is disposed at one of the two terminal ends, and a nitrogen ion (N+) and a bromide ion (Br+) are ionic-bonded to exhibit hydrophilicity.

The hydrophobic group is disposed at the other terminal end where the hydrophilic group is not disposed, and the liquid crystal molecules 31 are disposed around the terminal end that exhibits hydrophobicity.

The liquid crystal molecules 31 may be adjacent to the terminal end where the hydrophobic group is disposed, the hydrophilic group may be adjacent to the common electrode 270, and the liquid crystal molecules 31 may be vertically aligned by the nanoparticle (not shown) when no electric field is applied to the common electrode 270.

In the present exemplary embodiment, the liquid crystal layer 3 may include less than 0.05 wt % of hexadecyl trimethyl ammonium bromide (HTAB) and less than 0.05 wt % of polyhedral o lig o meric silsesquioxanes (POSS).

This is for the nanoparticles to be injected into the liquid crystal layer 3 to effectively perform the vertical alignment.

The liquid crystal molecules 31 are vertically aligned by one surface including the nanoparticles such as HTAB or POSS.

Accordingly, as shown in the exemplary embodiment of the present invention, the lower panel 100 allows the liquid crystal molecules 31 to have the pretilts, and the upper panel 200 allows the liquid crystal molecules 31 to be vertically aligned.

Accordingly, reduction in luminance due to texture and the like can be controlled even in the curved display device where the upper and lower substrates are misaligned.

A basic electrode 199 will now be described with reference to FIG. 5.

As shown in FIG. 5, the basic electrode 199 has an overall quadrangular shape, and includes a cross-shaped stem portion that consists of a horizontal stem portion 193 and a vertical stem portion 192 perpendicular thereto.

In addition, the basic electrode 199 is divided into a first subregion Da, a second subregion Db, a third subregion Dc, and a fourth subregion Dd by the horizontal stem portion 193 and the vertical stem portion 192, and each of the subregions Da to Dd includes a plurality of first minute branch portions 194a, a plurality of second minute branch portions 194b, a plurality of third minute branch portions 194c, and a plurality of fourth minute branch portions 194d.

The first minute branch portions 194a obliquely extend from the horizontal stem portion 193 or vertical stem portion 192 in an upper left direction, and the second minute branch portions 194b obliquely extend from the horizontal stem portion 193 or vertical stem portion 192 in an upper right direction.

The third minute branch portion 194c obliquely extend from the horizontal stem portion 193 or vertical stem portion 192 in a lower left direction, and the fourth minute branch portion 194d obliquely extend from the horizontal stem portion 193 or vertical stem portion 192 in a lower right direction.

The first to fourth minute branch portions 194a, 194b, 194c, and 194d form an angle of about 45° or 135° with the gate lines 121a and 121b or the horizontal stem portion 193.

In addition, the minute branch portions 194a, 194b, 194c, and 194d of the two neighboring subregions Da, Db, Dc, and Dd may be perpendicular to each other.

The minute branch portions 194a, 194b, 194c, and 194d may have a width of 2.5 µm to 5.0 µm, and intervals between the neighboring minute branch portions 194a, 194b, 194c, and 194d within each of the subregions Da, Db, Dc, and Dd may be 2.5 µm to 5.0 µm.

According to another exemplary embodiment of the present invention, the widths of the minute branch portions 194a, 194b, 194c, and 194d may become greater closer to the horizontal stem portion 193 or the vertical stem portion 192, and a difference between the widest and narrowest portions of the minute branch portions 194a, 194b, 194c, and 194d may be 0.2 µm to 1.5 µm.

The first and second subpixel electrodes 191a and 191b are respectively coupled to the first and second drain electrodes 175a and 175b through the first and second contact holes 185a and 185b such that they are applied with the data voltage from the first and second drain electrodes 175a and 175b.

In this case, sides of the first to fourth minute branch portions 194a, 194b, 194c, and 194d distort the electric field to generate a horizontal component that determines tilt directions of the liquid crystal molecules 31.

The horizontal component of the electric field is nearly parallel to the sides of the first to fourth minute branch portions 194a, 194b, 194c, and 194d.

Accordingly, as shown in FIG. 5, the liquid crystal molecules 31 are tilted in directions parallel to length directions of the minute branch portions 194a, 194b, 194c, and 194d.

Since each basic electrode 199 includes the four subregions Da, Db, Dc, and Dd in which the length directions of the minute branch portions 194a, 194b, 194c, and 194d are different, the liquid crystal molecules 31 substantially have four different tilt directions such that four domains in which alignment directions of the liquid crystal molecules 31 are different are created in the liquid crystal layer 3.

As such, when the liquid crystal molecules 31 are tilted in various directions, a reference viewing angle of the LCD becomes wider.

The alignment layer 11 and arrangement of the liquid crystal molecules 31 according to the exemplary embodiment of the present invention will now be described with reference to FIGS. 6 to 8.

Figure 6:
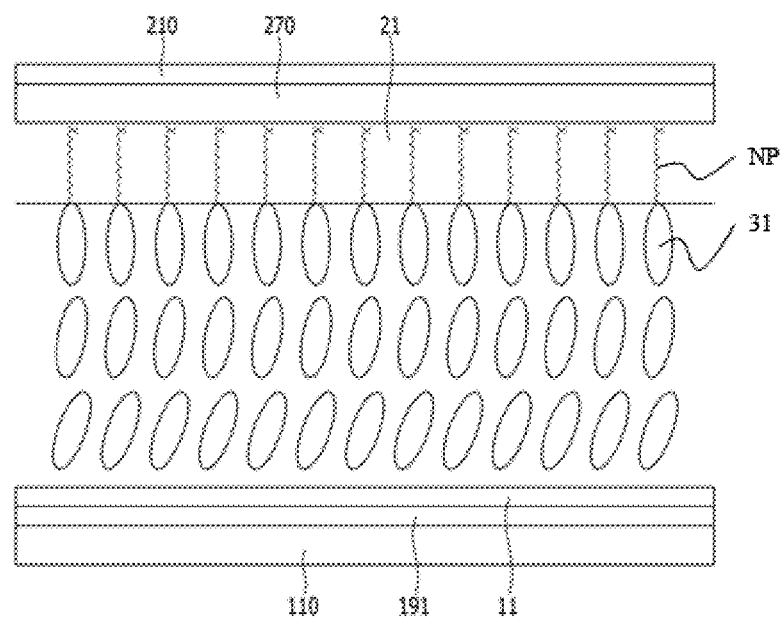
FIG. 6 is a cross-sectional view of some constituent elements of the display device according to the exemplary embodiment of the present invention.
Figure 7:
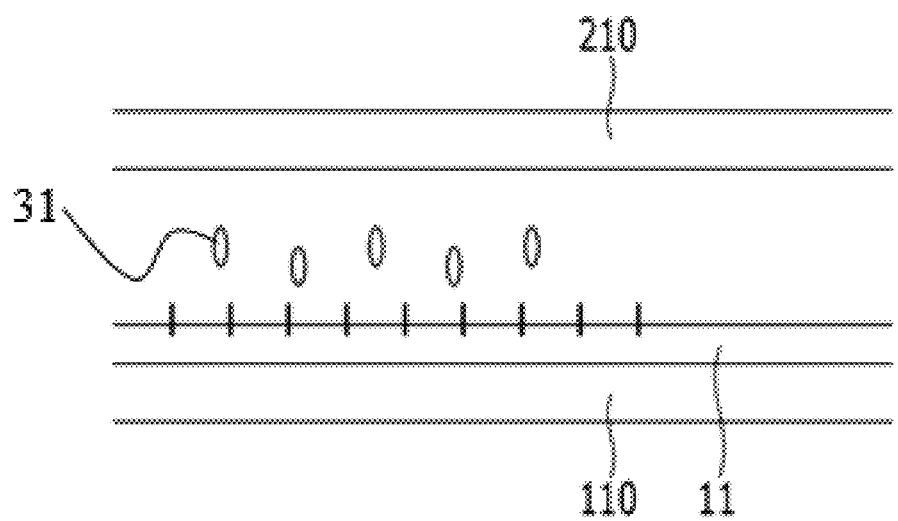
FIGS. 7 and 8 are cross-sectional views schematically illustrating movement of liquid crystal molecules according to the exemplary embodiment of the present invention.
Figure 8:
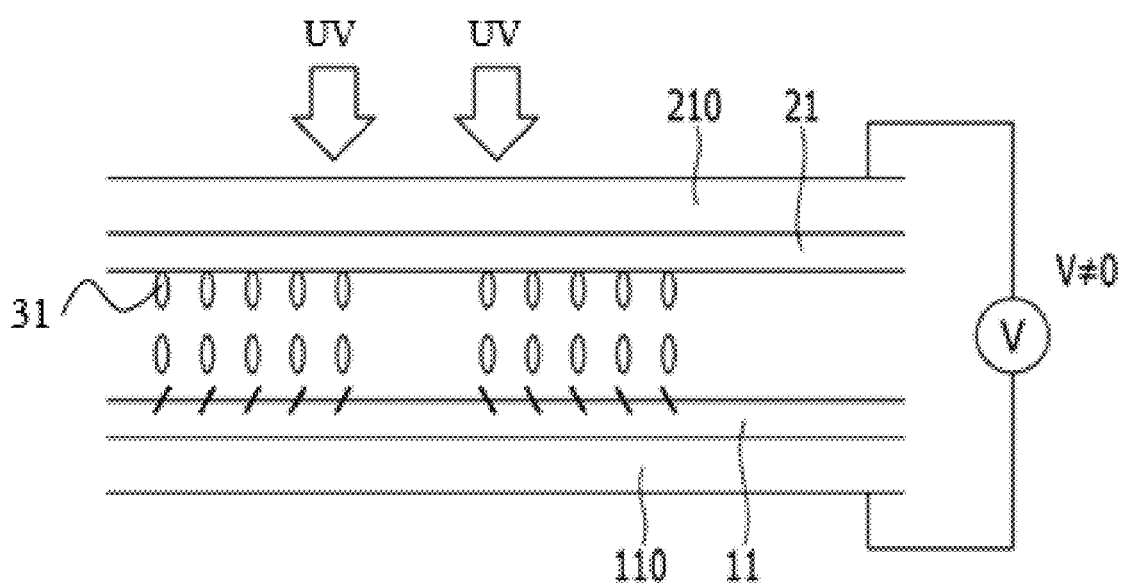

FIG. 6 is a cross-sectional view of some constituent elements of the display device according to the exemplary embodiment of the present invention, and FIGS. 7 and 8 are cross-sectional views schematically illustrating movement of the liquid crystal molecules according to the exemplary embodiment of the present invention.

Referring first to FIG. 6, the first alignment layer 11 including the alignment polymer is disposed on the first insulation substrate 110 and the pixel electrode 191 according to the exemplary embodiment of the present invention.

The first alignment layer 11 allows the liquid crystal molecules 31 adjacent thereto to be pretilted by the alignment polymer.

Meanwhile, the nanoparticles NP are arranged on the second insulation substrate 210 and the common electrode 270, thereby forming the layer 21.

The liquid crystal molecules 31 adjacent to the nanoparticle layer 21 are vertically arranged thereby.

As such, when the front alignment layer 11 is applied to the curved display device, even if the upper and lower substrates are misaligned, texture generation is controlled by the upper substrate including no pretilt in relation to the lower substrate, thereby enabling the transmittance decrease and the luminance to be controlled.

The arrangement of the liquid crystal molecules 31 according to the present invention will now be described with reference to FIGS. 7 and 8. As shown in FIG. 7, the first alignment layer 11 including the alignment polymer is coated on the first insulation substrate 110 to be hardened.

The alignment polymer may be the reactive mesogen.

Next, the nanoparticles and the liquid crystal molecules 31 are injected between the first and second insulation substrates 110 and 210, a voltage is applied, and they are irradiated by ultraviolet rays (UV).

As the voltage is applied and the ultraviolet rays are irradiated, the alignment polymer included in the first alignment layer 11 enables the adjacent liquid crystal molecules 31 to have pretilts.

Accordingly, during the process of injecting the liquid crystal molecules 31 and forming the alignment layer 11, the lower panel 100 is formed with the first alignment layer 11 for enabling the liquid crystal molecules 31 to have the pretilts, and the nanoparticle layer 21 for enabling the nanoparticles injected into the liquid crystal layer to be moved so as to vertically align the liquid crystal molecules 31 is formed.

However, the present invention is not limited to such a manufacturing process.

The vertical alignment of the liquid crystal molecules 31 using the nanoparticles will now be described with reference to FIGS. 9A to 10B.

Figure 9A:
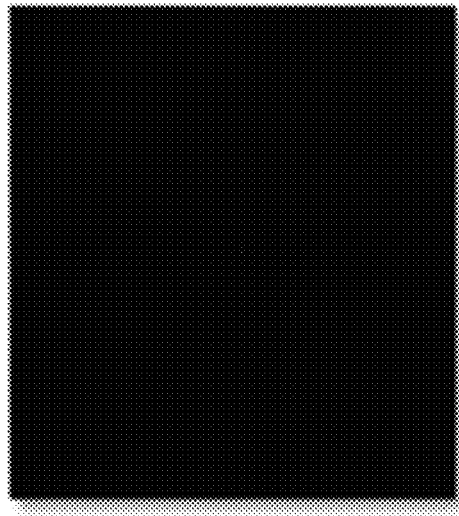
FIGS. 9A and 9B are images illustrating movement of liquid crystals when vertical alignment layers are disposed in both substrates.
Figure 9B:
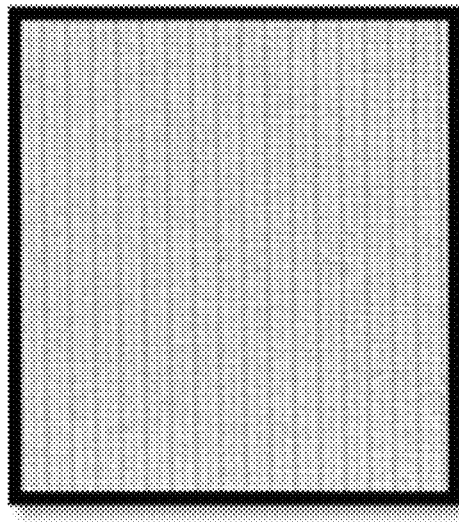
Figure 10A:
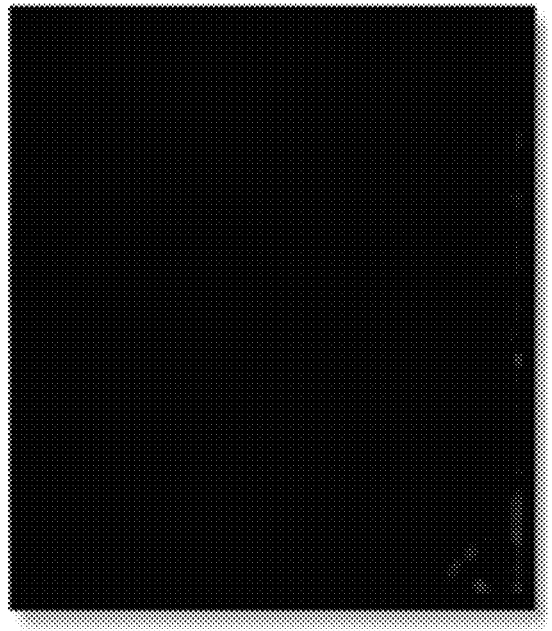
FIGS. 10A and 10B are images illustrating movement of the liquid crystals when nanoparticles are disposed in both substrates.
Figure 10B:
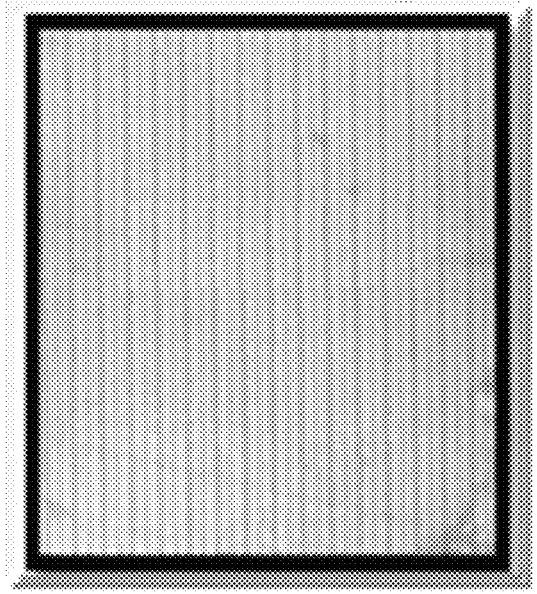

FIGS. 9A and 9B are images illustrating movement of liquid crystal molecules 31 when both substrates have the vertical alignment, and FIGS. 10A and 10B are images illustrating movement of the liquid crystal molecules 31 when the nanoparticles are disposed in both substrates.

FIGS. 9A and 9B illustrate the case in which the upper and lower panels 200 and 100 include the vertical alignment layer, and FIGS. 10A and 10B illustrate the case in which the liquid crystal layer includes 0.05 wt % of HTAB without the additional alignment layer.

FIGS. 9A and 10A illustrate the case in which the voltage is 0 V, and FIGS. 9A and 10B illustrate the case in which the voltage is 8 V.

As such, under the same conditions where the alignment layer 11 is excluded, the alignment layers are compared and it can be seen that the vertical alignment of the liquid crystal molecules 31 is possible using the nanoparticles such as HTAB even if the vertical alignment layer is not used.

Luminance variation caused by misalignments according to pretilt angles will now be described with reference to FIGS. 11A to 15B.

FIG. 11A to FIG. 15B are images of the pixel according to inclinations of the liquid crystal molecules 31 with respect to both substrates.

FIGS. 11A to 15B illustrate the cases in which the liquid crystal molecules 31 adjacent to the lower panel have a pretilt angle of 89° and the upper substrate have the liquid crystal molecules 31 of FIGS. 11A and 11B, FIGS. 12A and 12B, FIGS. 13A and 13B, FIGS. 14A and 14B, and FIGS. 15A and 15B arranged at the angles of 89°, 89.2°, 89.5°, 89.8°, and 90°, respectively.

In each figure number of the drawings, "A" represents the flat panel display, and "B" represents the curved display device in which the misalignment corresponding to about 30 μm occurs.

Referring first to FIGS. 11A, 12A, 13A, 14A, and 15A, texture is hardly generated in the flat panel display regardless of the pretilt angles of the liquid crystal molecules 31.

Figure 11A:
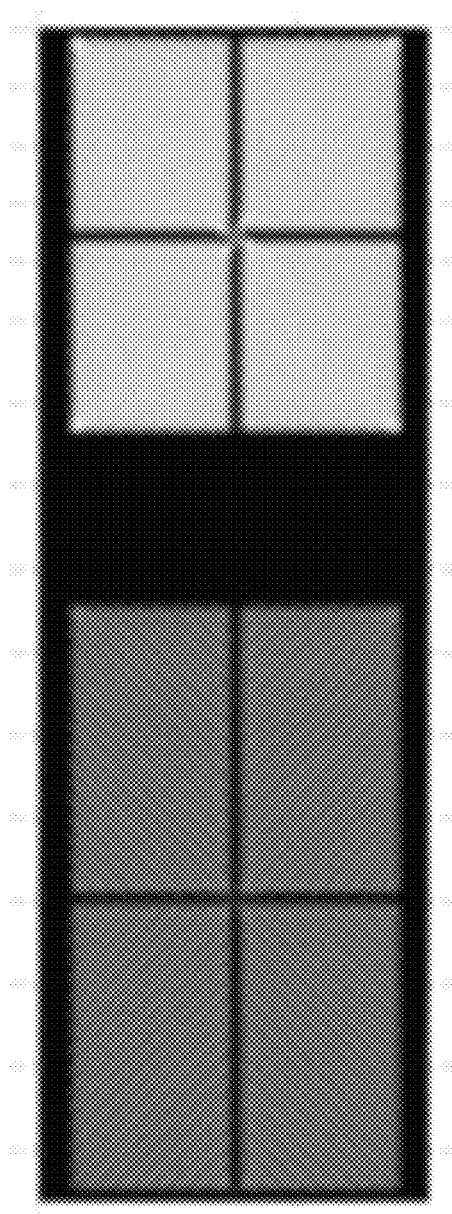
FIG. 11A to FIG. 15B are images of the pixel according to inclinations of the liquid crystal molecules with respect to both substrates.
Figure 11B:
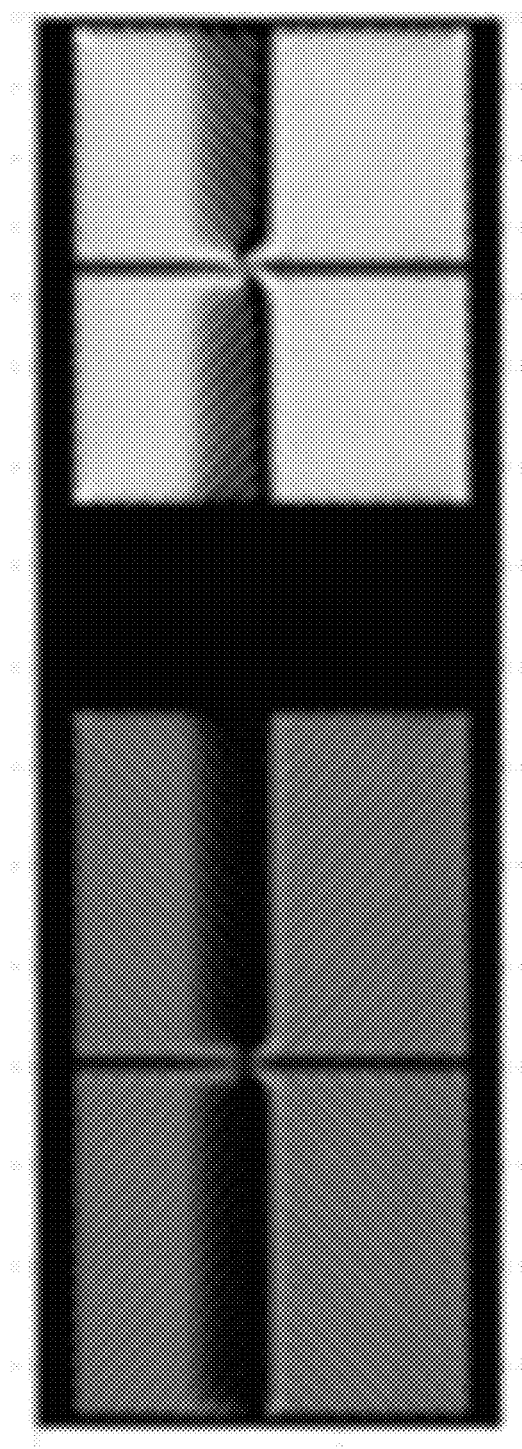
Figure 12A:
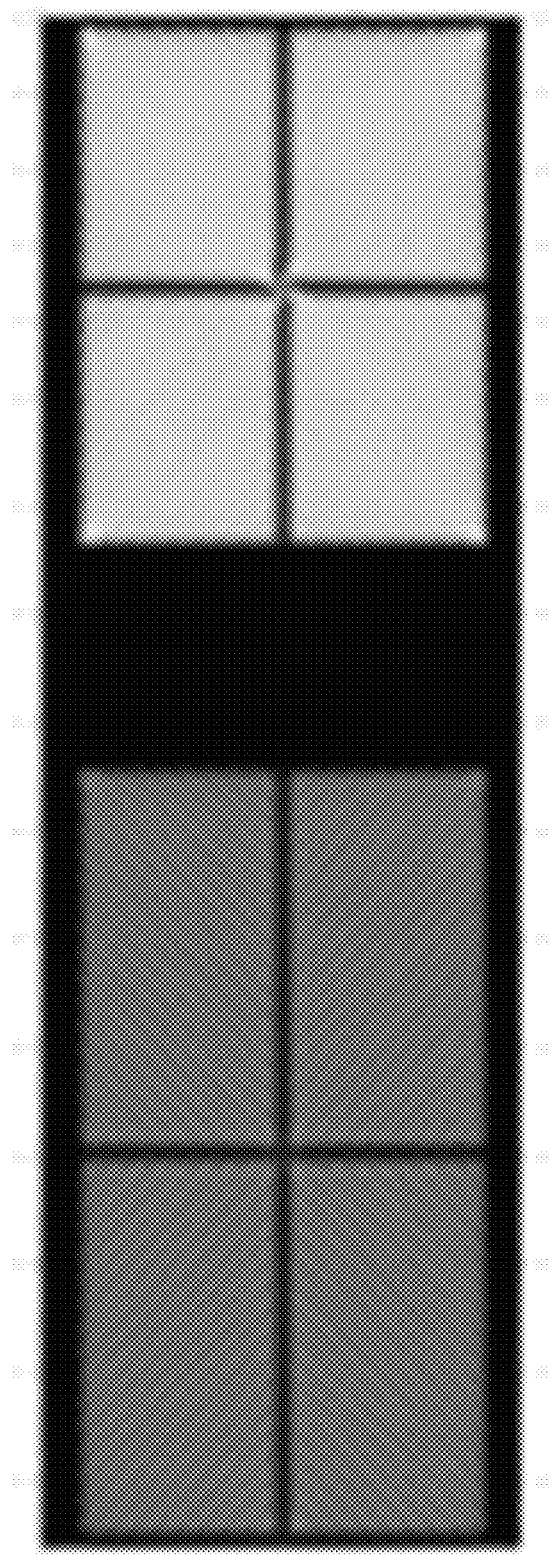
Figure 12B:
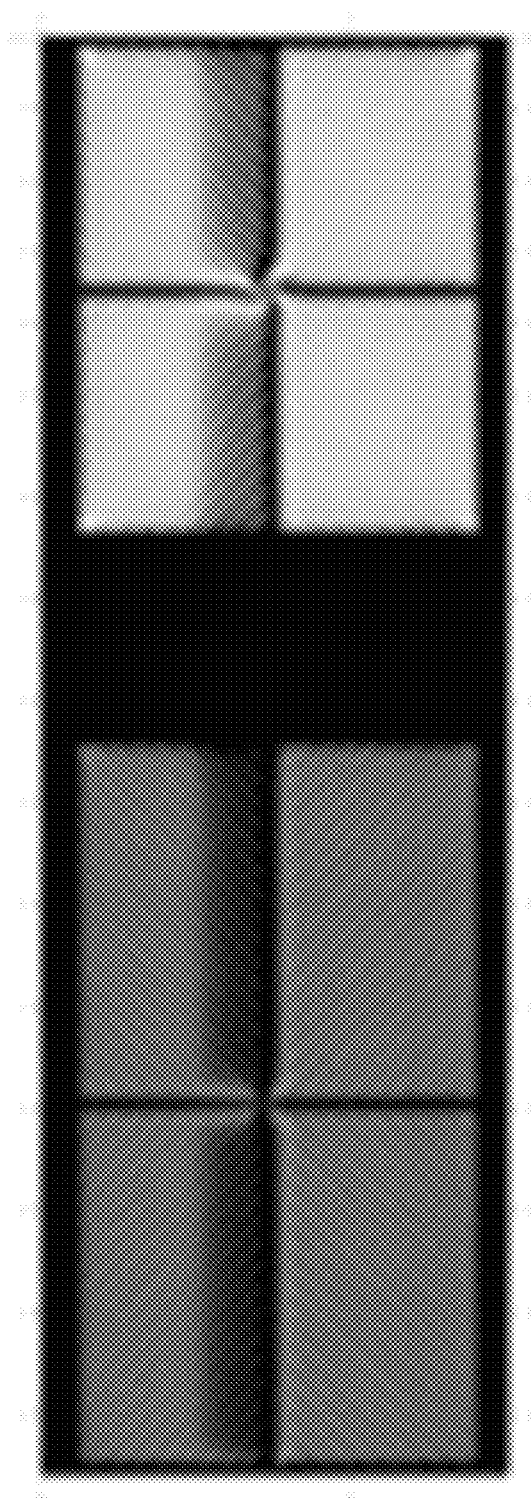
Figure 13A:
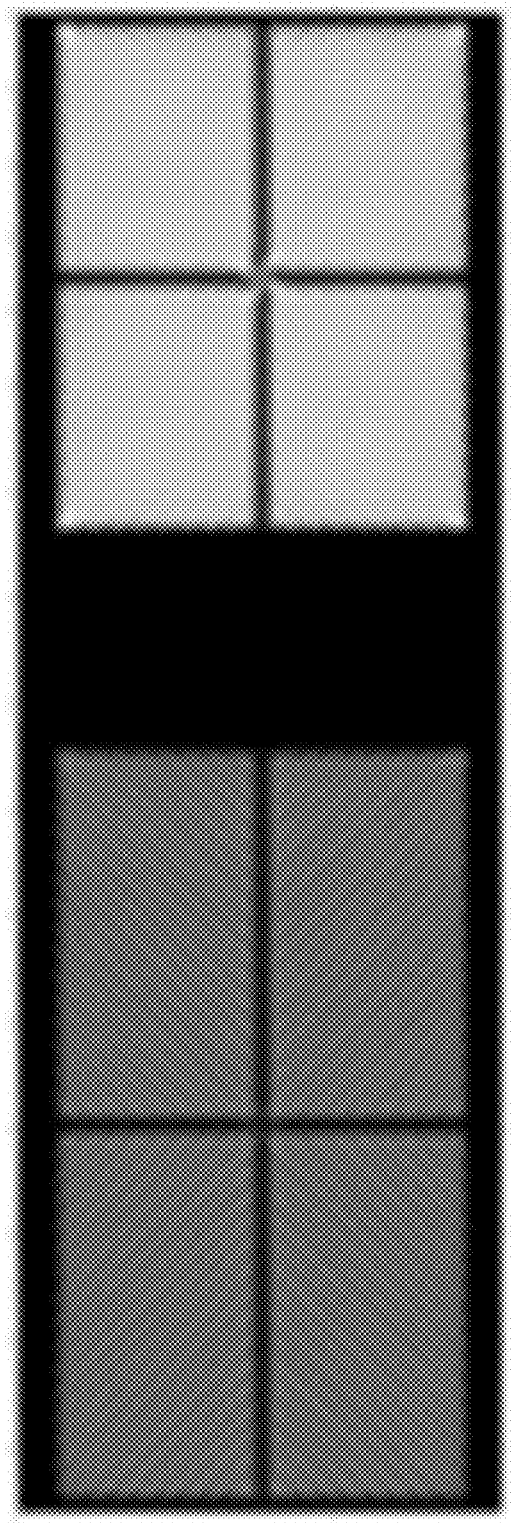
Figure 13B:
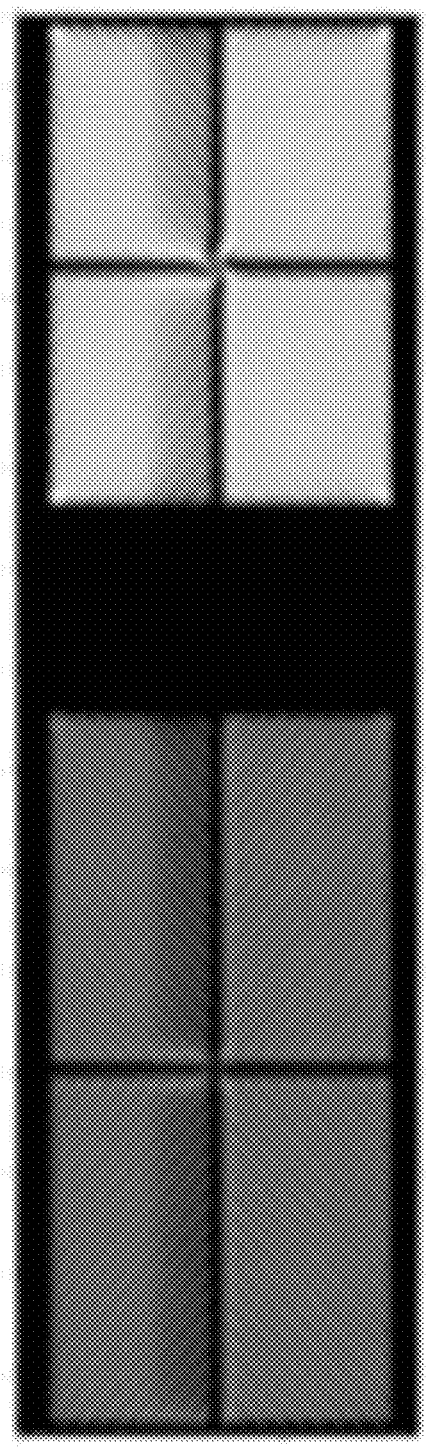

However, referring to FIGS. 11B, 12B, and 13B, as the upper panel is applied to the curved display device while including the liquid crystal molecules 31 having the pretilts of about 89° to about 89.5°, a significant amount of texture due to the misalignment is generated.

The generated texture causes a decrease in transmittance for each case, and the respective case show luminance differences of about 9%, 6.9%, and 4%, respectively.

Figure 14A:
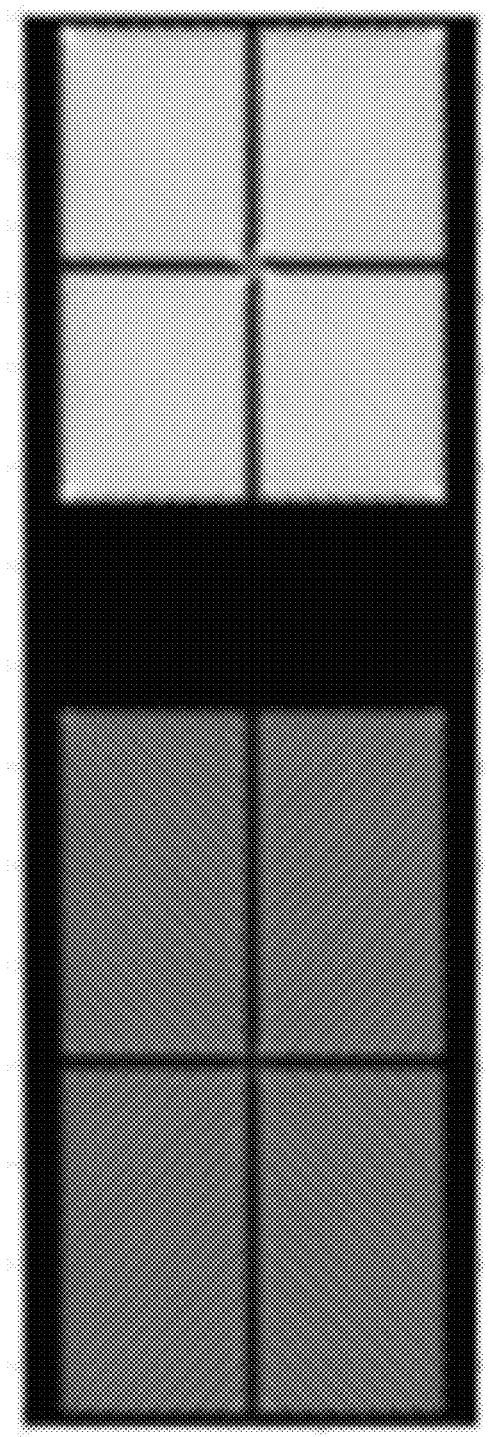
Figure 14B:
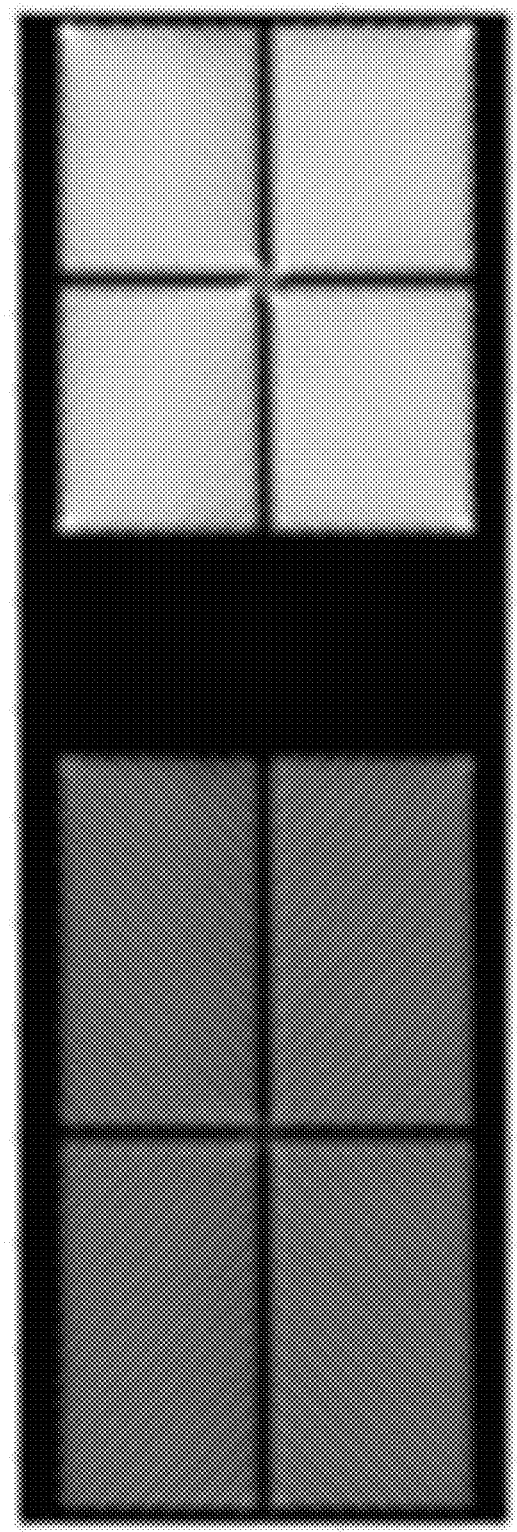
Figure 15A:
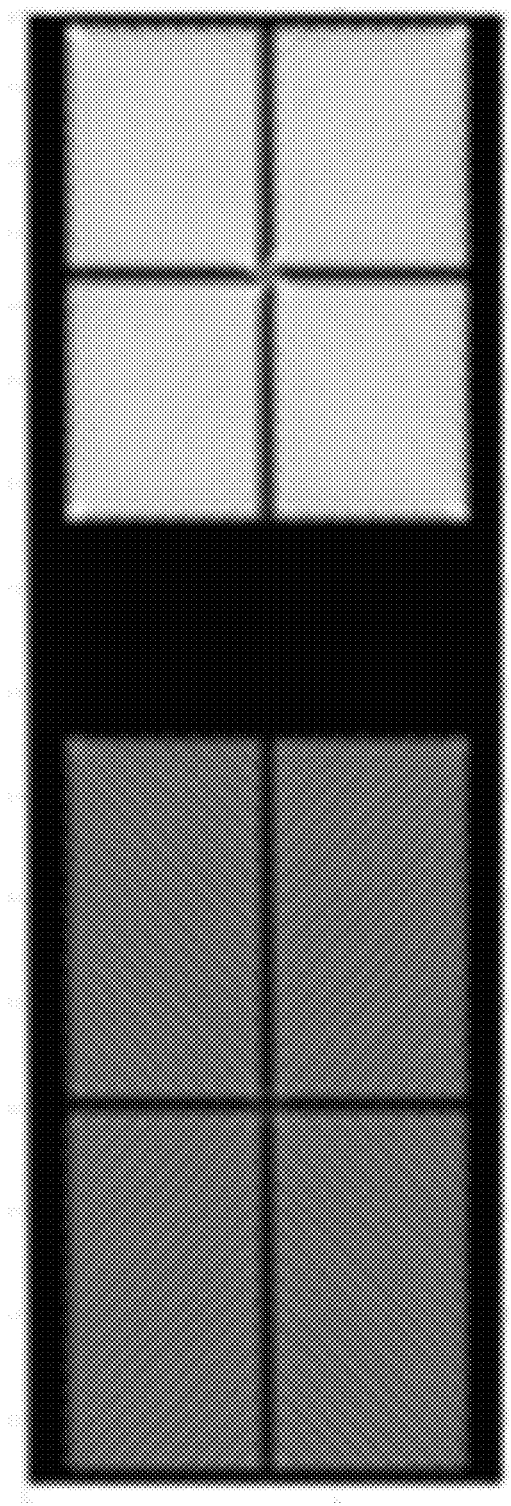
Figure 15B:
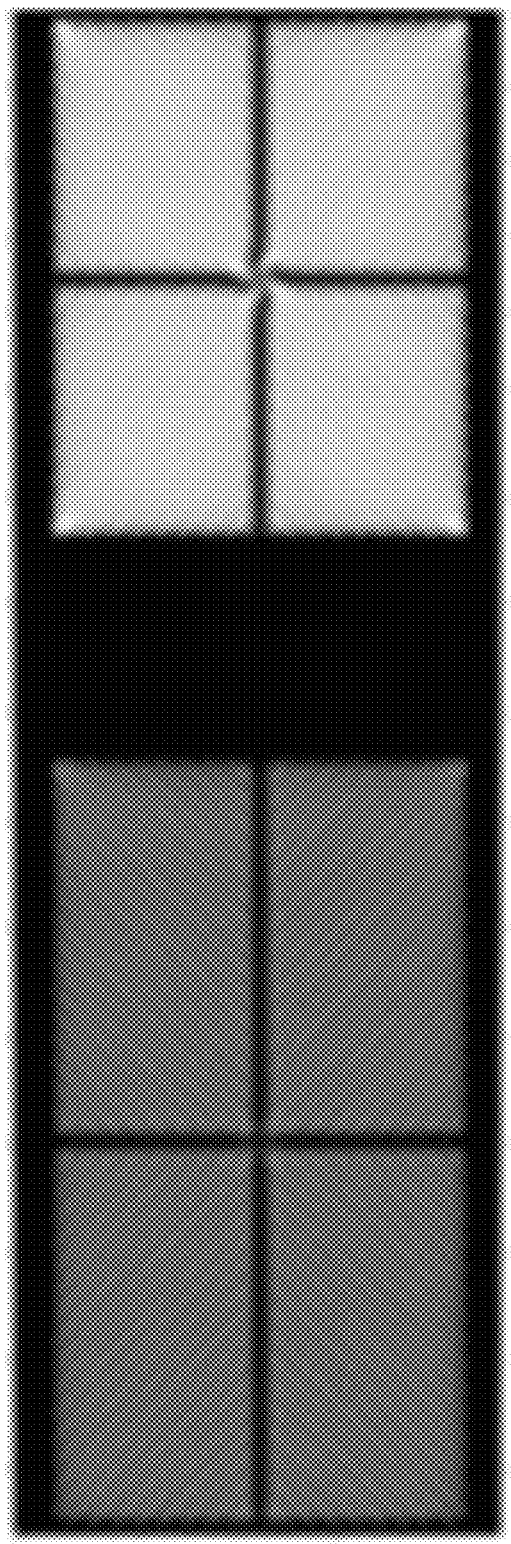

In contrast, according to FIGS. 14B and 15B, even if the misalignment occurs in the curved display device, texture is hardly generated since the liquid crystal molecules 31 adjacent to the upper panel have no pretilt.

Luminance differences for the respective cases also are about 1.2% and 0%, respectively, so it can be seen that the decrease in luminance can be controlled.

In summary, when the lower panel includes the alignment layer 11 for enabling the liquid crystal molecules 31 to have the pretilts and the liquid crystal molecules 31 are vertically aligned by the upper panel using the nanoparticles without the additional alignment layer, the display defects such as the texture can be controlled despite the misalignment of the curved display device, thereby controlling the decrease in luminance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

3: liquid crystal layer
31: liquid crystal molecule
100: lower panel
200: upper panel
121: gate line
140: gate insulating layer
230: color filter
270: common electrode

What is claimed is:

1. A display device comprising:
a first insulation substrate;
a pixel electrode disposed on the first insulation substrate;
a first alignment layer disposed on the pixel electrode;
a second insulation substrate facing the first insulation substrate;
a common electrode disposed on the second insulation substrate; and
a liquid crystal layer disposed between the first and second insulation substrates, wherein the liquid crystal layer includes liquid crystal molecules and nanoparticles, and the nanoparticles are disposed adjacent to the common electrode,
wherein the first alignment layer includes an alignment polymer,
liquid crystal molecules adjacent to the first alignment layer have pretilts, and liquid crystal molecules adjacent to the nanoparticles are vertically aligned.

2. The display device of claim 1, wherein the nanoparticles include a chain-shaped hydrocarbon, and the chain-shaped hydrocarbon includes two terminal ends that respectively include a hydrophilic group and a hydrophobic group.

3. The display device of claim 2, wherein the common electrode and the hydrophilic group of the nanoparticles are adjacent to each other.

4. The display device of claim 3, wherein the chain-shaped hydrocarbon extends in a direction perpendicular to a flat surface of the common electrode.

5. The display device of claim 2, wherein the liquid crystal molecules are adjacent to the terminal end in which the hydrophobic group is disposed, and the liquid crystal molecules are vertically aligned when no electric field is applied to the common electrode.

6. The display device of claim 1, wherein the nanoparticles include any one of hexadecyl trimethyl ammonium bromide (HTAB) and polyhedral oligomeric silsesquioxanes (POSS).

7. The display device of claim 1, wherein the nanoparticles are represented by the following Chemical Formula 1 or Chemical Formula 2, Chemical Formula 1

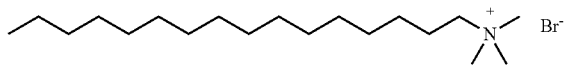

Chemical Formula 2

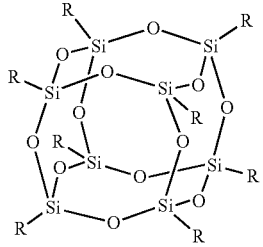

wherein the R is an isobutyl group.

8. The display device of claim 6, wherein the content of the nanoparticle is about less than 0.05 wt %.

9. The display device of claim 1, wherein the display device further includes a thin film transistor that is disposed on the first insulation substrate to be coupled to the pixel electrode, and the pixel electrode includes a plurality of minute branch portions.

10. The display device of claim 9, wherein the thin film transistor includes a gate line and a data line that are insulated from and cross each other, and the pixel electrode includes a first subpixel electrode and a second subpixel electrode.

11. The display device of claim 10, wherein the first and second subpixel electrodes are spaced apart from each other based on the gate line.

12. The display device of claim 11, wherein a voltage difference between the first subpixel electrode and the common electrode is greater than that between the second subpixel electrode and the common electrode.

13. The display device of claim 1, wherein the display device is a curved type.

14. The display device of claim 13, wherein the liquid crystal molecules are arranged on a curved surface of the common electrode and are aligned to a same direction.

* * * * *